(12) United States Patent
Fletcher

(10) Patent No.: US 8,034,289 B2
(45) Date of Patent: Oct. 11, 2011

(54) FLUID TREATMENT PROCESS AND APPARATUS

(76) Inventor: Jeffrey Fletcher, Kelowna (CA)

( * ) Notice: Subject to any disclaimer, the term of this patent is extended or adjusted under 35 U.S.C. 154(b) by 183 days.

(21) Appl. No.: 12/588,676

(22) Filed: Oct. 23, 2009

(65) Prior Publication Data

US 2010/0116756 A1     May 13, 2010

Related U.S. Application Data

(63) Continuation-in-part of application No. 12/138,558, filed on Jun. 13, 2008, now abandoned.

(51) Int. Cl.
*A61L 2/04*     (2006.01)
(52) U.S. Cl. .......................................... 422/38; 210/774
(58) Field of Classification Search .................. None
See application file for complete search history.

(56) References Cited

U.S. PATENT DOCUMENTS

| | | | |
|---|---|---|---|
| 5,447,642 A * | 9/1995 | Schenach | 210/774 |
| 6,555,055 B1 | 4/2003 | Cisar et al. | |
| 7,402,241 B2 | 7/2008 | Wright et al. | |
| 7,837,865 B2 * | 11/2010 | Wadstrom | 210/85 |
| 2009/0004045 A1 * | 1/2009 | Fletcher | 422/1 |
| 2010/0116756 A1 * | 5/2010 | Fletcher | 210/775 |

* cited by examiner

*Primary Examiner* — Robert James Popovics
(74) *Attorney, Agent, or Firm* — Antony C. Edwards

(57) ABSTRACT

A water treatment process whereby heat is used and recaptured to pasteurize water and or sewage effluent. Contaminated waters are partially treatable utilizing bacterial and chemical processes; however some bacteria (e.g. Cryptosporidium and Giardia) are resistant to chemicals. The present process raises the temperature of the water to a desired pasteurization temperature and for a corresponding required length of time to destroy pathogens and viruses. A heat exchanger is employed to use the waste heat from the pasteurization tank to pre-heat the fluid entering the tank. After the initial heating of the tank, the pre-heating reduces the required heat to maintain the temperature of the tank. Make-up heat increases the temperature within a small temperature range. The make-up heat may be waste heat from a separate process.

7 Claims, 6 Drawing Sheets

FLUID TREATMENT PROCESS AND APPARATUS

CROSS REFERENCE TO RELATED APPLICATION

This application is a continuation-in-part of U.S. patent application Ser. No. 12/138,558 filed Jun. 13, 2008 now abandoned which claims priority from Canadian Patent Application No. 2,592,767 filed Jun. 28, 2007 entitled Water Treatment and Apparatus.

FIELD OF THE INVENTION

The present invention relates to pollution reduction, and more particularly, to the treatment of contaminated waste waters and drinking water.

BACKGROUND OF THE INVENTION

Planet Earth should be our most prized possession, however, each and every day our waters are being polluted with industrial wastes and sewage.

Cities and towns, when economically feasible, do employ primary and secondary waste water treatment methods, however, the effluent from these methods may still contain viruses and pathogens that contaminate surface or subsurface waters. Specifically:

1. It is estimated that at least 10,000 people per day die from the most basic water-borne diseases.
2. Indian and Northern Affairs Canada have tested and confirmed that in excess of 100 water systems in Northern Canada have potential health and safety concerns.
3. The British Columbia Waste Water Association estimates that 20% of 250,000 on-site sewage and disposal systems in British Columbia are failing.
4. It was discovered in 2003 that sewage contains and spreads the SARS and West Nile Virus.
5. A recent Canadian health report claims "Cancer" will strike 41% of Canadian males and 38% of Canadian females. Studies have shown that chemicals like chlorine which are used to disinfect water interact with organic materials to form carcinogenic chemicals know as Trihalomethanes.
6. The United States Environmental Protection Agency has recently identified more than 200 disinfection by-products from: Chlorine, Ozone, Chlorine Dioxide and Chloramines that may pose health risks.
7. In British Columbia, there are at least 100 "Boil Advisories" any day of the year.

What is therefore desired is a novel fluid pasteurization treatment apparatus and process which uses considerably less energy during the pasteurization process by utilizing what would otherwise be waste heat, among other advantages and innovations to implement the process according to the present invention as better set out below.

SUMMARY OF THE INVENTION

According to the present invention, there is provided in one aspect a process for economically pasteurizing sewage effluent, drinking water or any waters that require the absence of living organisms.

In another aspect the invention provides an apparatus whereby the desired contaminated water is pre-filtered and heated to an adequate temperature that will destroy most pathogens and viruses by the use of a counter-flow heat exchanger between a cold in-flow of un-treated fluid and a hot treated fluid leaving the pasteurization chamber.

In another aspect the invention provides an apparatus whereby the pasteurization operating temperature can be maintained once the pasteurization chamber is initially brought to its operating temperature with little or no additional heating required.

In yet another aspect the invention provides an apparatus that can utilize natural gas, propane, electricity, solar power or waste heat from other processes to provide any make-up heat required, for instance an additional 1.1% heat to maintain the required pasteurization temperature.

BRIEF DESCRIPTION OF THE DRAWINGS

Embodiments of the invention will now be described, by way of example only, with reference to the accompanying drawings, wherein.

DETAILED DESCRIPTION OF EMBODIMENTS OF THE INVENTION

The invention described herein includes a process and an apparatus to utilize only heat, and to recover and re-use what would conventionally be waste heat in a pasteurization process to pasteurize fluids such as sewage effluent and contaminated waters to a high degree of purity without the use of chemicals, thereby eliminating chemical pollution and carcinogenic by-products.

Figure 1:
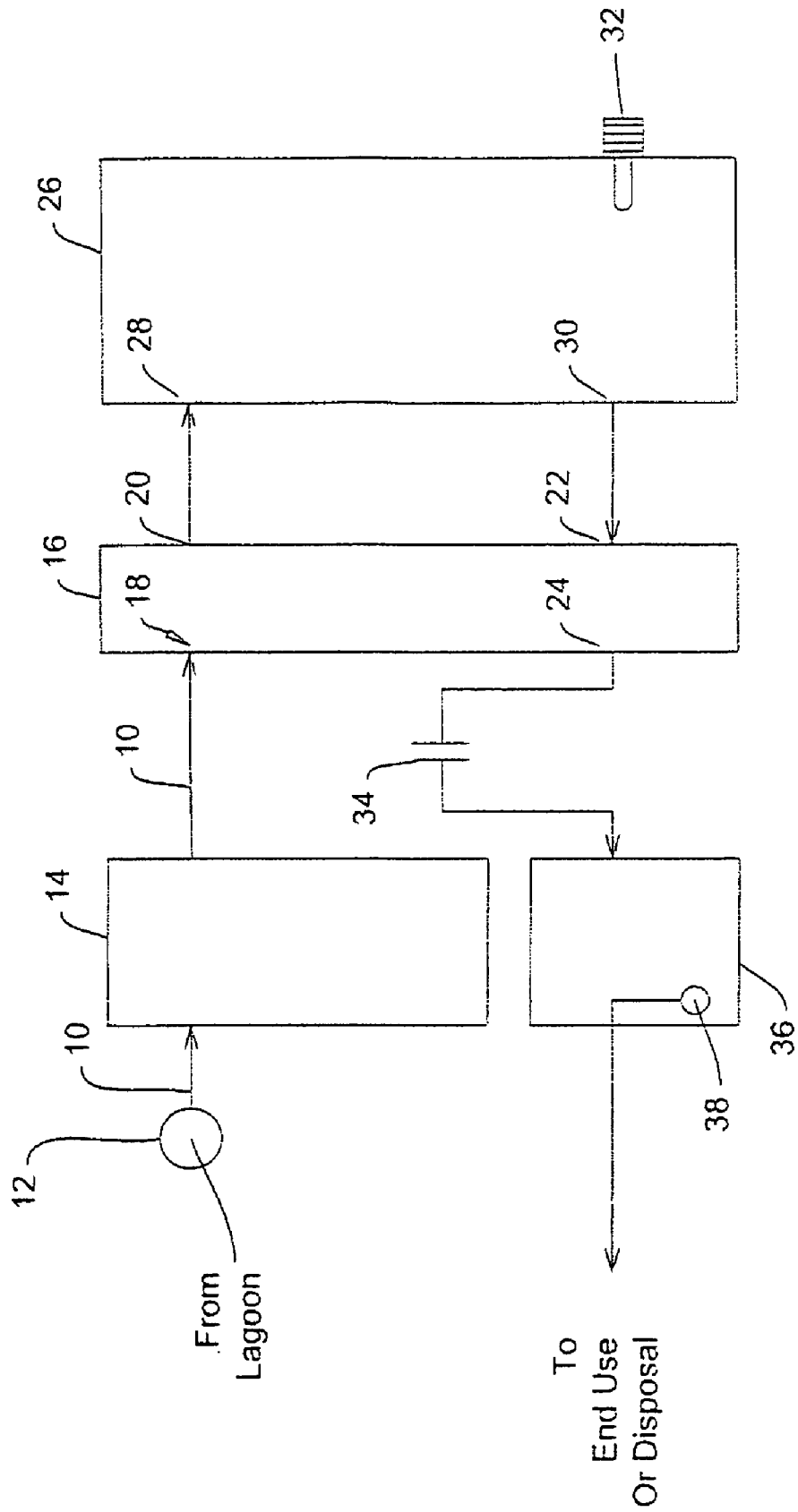
FIG. 1 is a diagrammatic view of the apparatus according the present invention for treating effluent sewage fluid.

With reference to FIG. 1, the fluid stream, in this embodiment a sewage liquid stream, to be pasteurized is pumped along fluid path 10 by pump 12 through a filter 14. The fluid then flows through a heat exchanger 16 from cold inlet 18 to hot outlet 20. The fluid then flows from the hot outlet 20, into a volume tank 26 having in one embodiment a two degree Fahrenheit differential between the incoming hot fluid at tank inlet 28 and the exiting heated fluid from tank outlet 30. The fluid in the heat exchanger section between cold inlet 18 and hot outlet 20 is heated by counter-flow within the heat exchanger, with hot pasteurized fluid arriving at hot inlet 22 from volume tank 26 and leaving the heat exchanger from cold outlet 24. The pre-heated fluid stream flows into volume tank 26 via tank inlet 28 and exits from the volume tank via tank outlet 30.

Volume tank 26 has a heat source 32 such as the electric heater seen in FIG. 1. The heat source may also be a heater using natural gas, propane, solar or any exterior heat source, such as waste heat from other processes such as an engine or motor generator set, etcetera.

Volume tank 26 is sized to provide a desired retention time of the fluid in the tank in order to achieve pasteurization. One skilled in the art and knowledgeable in the required temperatures and retention times in order to achieve pasteurization of the particular fluid would know that different approaches may be employed to suit different circumstances. However, increasing the desired temperature to achieve pasteurization may also increase the required top-up or make-up heat required to be supplied in the volume tank to achieve that pasteurization. This may then increase the required top-up temperature differential above the desired range of 1-2 degrees Fahrenheit (e.g. to 3 degrees F. or above). This will adversely affect the operating and capital costs of the apparatus and process.

The fluid then flows from the volume tank 26 back through the heat exchanger 16, entering at 22, giving up approximately 98.9% of its enthalpy during the counter-flow to pre-heat the cold liquid stream entering the heat exchanger at 18. The heat source 32 in the volume tank provides the additional 1.1% required top-up heat. It is understood that efficiencies of heat exchangers may vary, thus affecting the amount of additional heat required to be added in the volume tank. However the desired range of temperature differential advantageously remains in the 1-3 degree Fahrenheit range. That is, in the preferred embodiments, the fluid in the volume tank need only be heated a further 1-3 degrees Fahrenheit above the pre-heat temperature provided by the heat exchanger in order to achieve pasteurization in the volume tank.

The liquid then flows through a siphon breaker 34 and then on to an accumulation tank 36 or directly to a sub-surface disposal field or to a receiving body of water or other disposal. Pump 38 may be provided for example to pump the treated fluid onto the disposal field.

Figure 2:
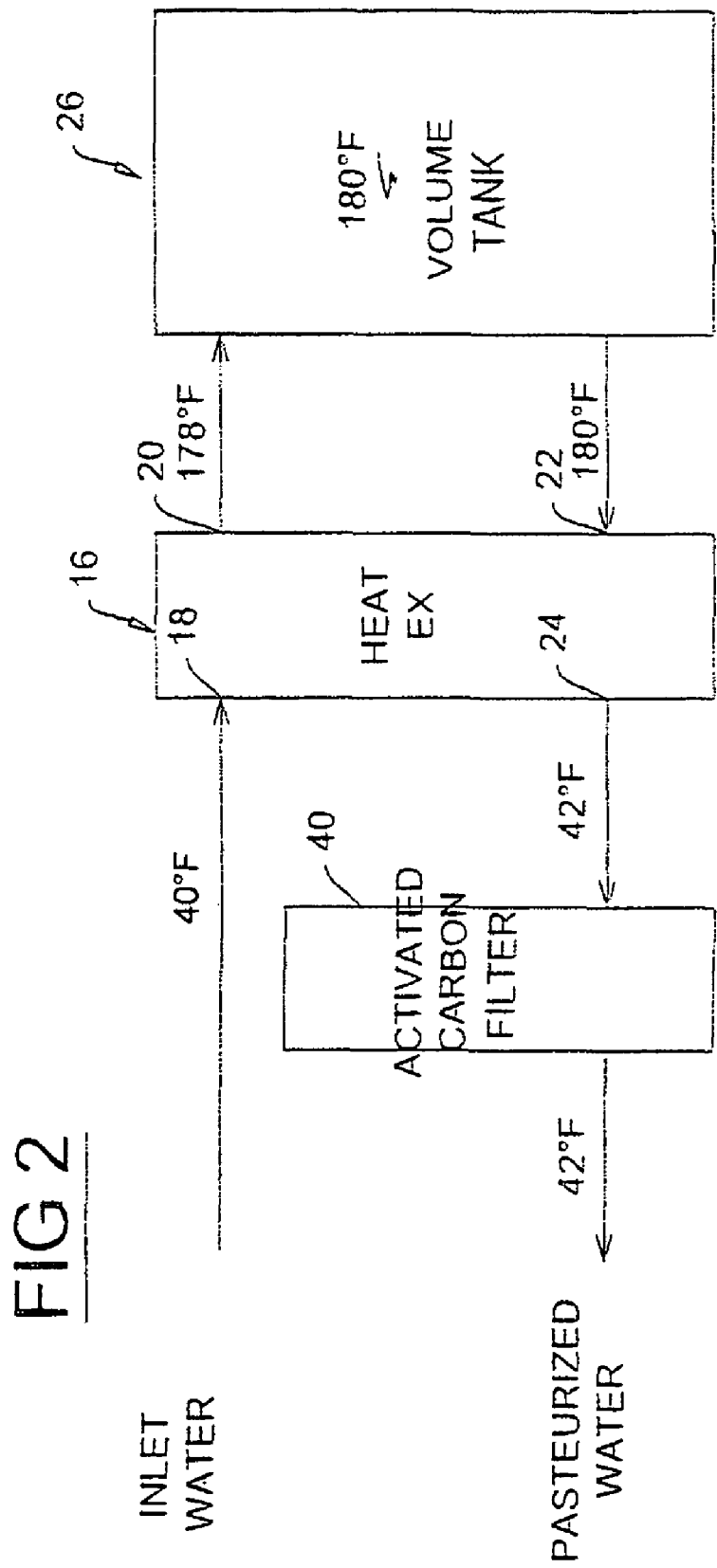
FIG. 2 is a diagrammatic view of the apparatus according to the present invention for treating water, showing temperatures according to one embodiment of the process.

FIG. 2 further illustrates the treatment of water according to the one aspect of the present invention. Water to be pasteurized, and made potable, enters the heat exchanger 16 at approximately 40 degrees F. The water is heated in the heat exchanger and exits to the volume tank 26 at 178 degrees F. The volume tank is heated as described above and sized to allow five minutes retention time to ensure all viruses and pathogens are destroyed. The water then flows from the volume tank back to the heat exchanger at 180 degrees F. where it gives up its enthalpy and exits at 42 degrees F. It then flows through an activated-carbon filter 40 for final purification by removing any taste, odours, and color.

Figure 4:
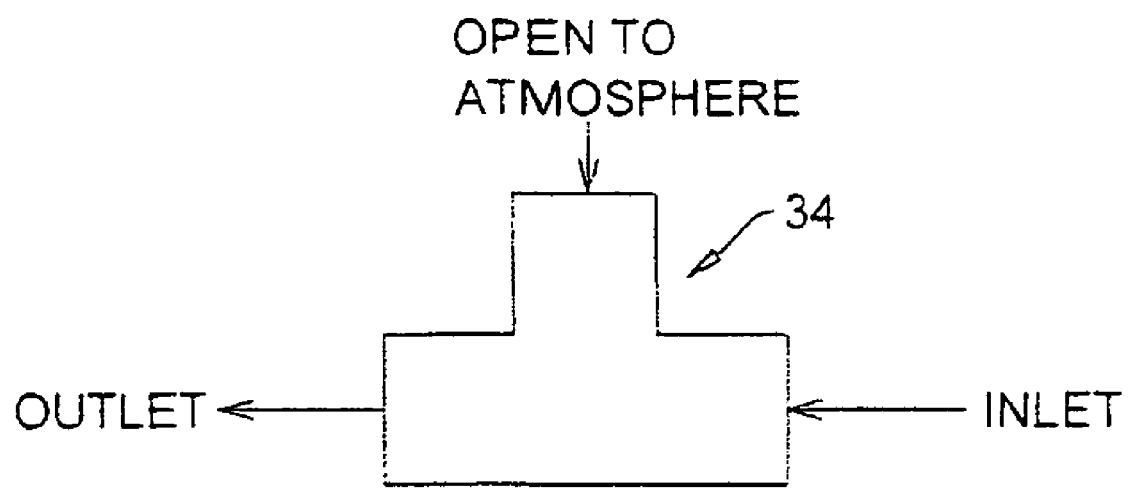
FIG. 4 is, in diagrammatic view, a siphon breaker according to one embodiment of the present invention.

As seen in FIGS. 1 and 4, siphon breaker 34 is provided to prevent the system from draining through a siphon action. Ideally, for maximum efficiency the system must be fluid packed, i.e. running substantially at 100 percent capacity, on a continual basis. Specifically, the siphon breaker may be a mechanical break or an open tee such as seen in FIG. 4 positioned to allow the top of the tee to be open to atmospheric pressure. The siphon breaker is positioned at a higher elevation than the volume tank.

Figure 3:
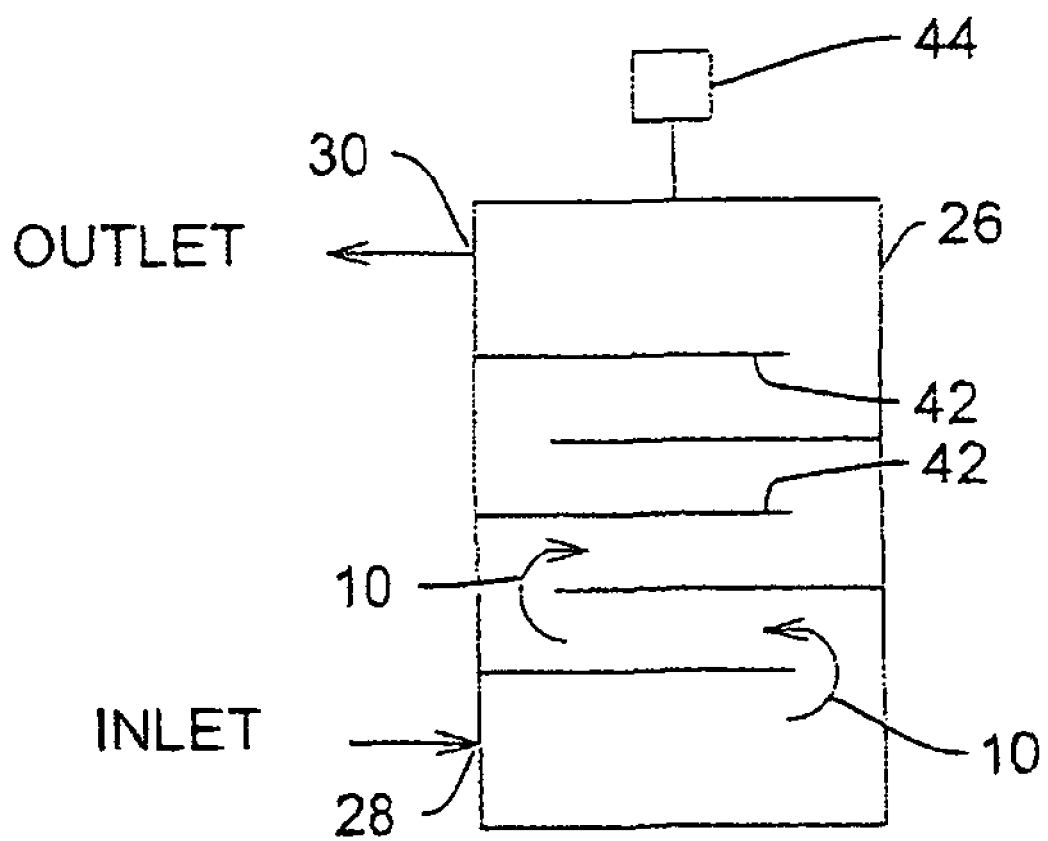
FIG. 3 is, in partially cutaway view, a volume tank according to the one embodiment of the present invention.

Normally, the inlet stream to be pasteurized enters tank inlet 28 at the bottom of the tank such as seen in FIG. 3, and then takes a tortuous path weaving back and forth through the baffles 42 to the tank outlet 30. The baffles force the fluid path and provide mixing to ensure the tank liquid is a homogeneous temperature through-out and thereby eliminate any possibility of channeling and hence low quality effluent. Channeling occurs where a thin stream of effluent or other contaminated fluid short-circuits between the tank inlet 28 and the tank outlet 30 without mixing and without sufficient dwell time in the tank to become heated by the make-up heat and thus pasteurized due to the temperature and duration. An air release valve 44 is provided on the tank to allow the escape of vapors that might accumulate as a result of heating the liquid. Top-up heat sources are located in the bottom portion of the tank, for example for heating the liquid by a make-up temperature differential of two degrees Fahrenheit.

Automatic air release valve 44 is installed on the volume tank at the highest point of the system. The valve also allows air to be removed from the system during start up. As the tank is flooded with water the air is pushed through the valve. The valve also works as a vacuum break when the tank is emptied to allow the water flow out and air to be pulled into the tank. Lastly, the valve allows any air and non-condensable gases to be blown off during operation. This ensures constant flow and keeps air from getting into the heat exchanger which can cause a decrease in the efficiency of the heat transfer.

As stated above, the heat source for providing top-up or make-up heat to the fluid in the volume tank may come from a variety of sources. For example, make-up heat may be provided by an electrical element as seen in FIG. 1. An immersion style electrical heater may be provided with a thermostatic control that regulates the temperature between 60 degrees F. and 250 degrees F. An electrical shut-off may be located at the top of the element bundle for fast shut-off response to prevent over-heating due to low-water level conditions.

Figure 5:
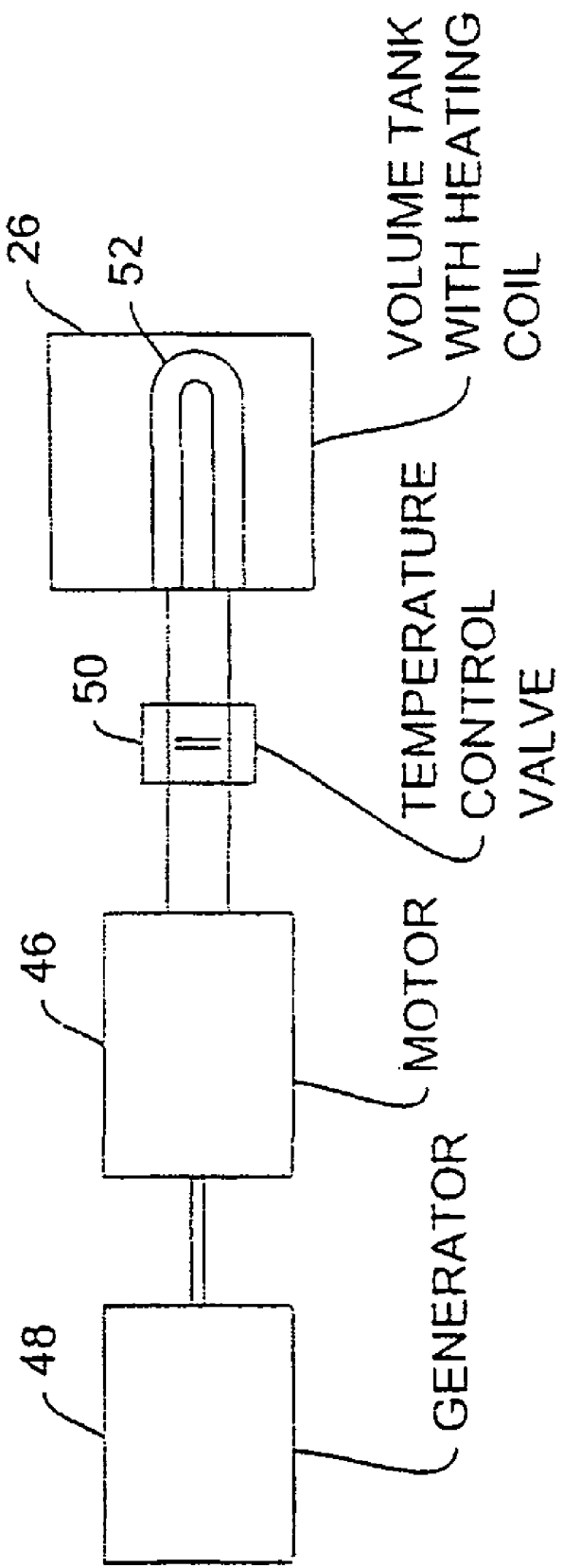
FIG. 5 is, in diagrammatic view, a diesel motor generator set according to one embodiment of the heat source used in the present invention.

The heat source may also be provided by a motor generator set as seen in FIG. 5. For example, advantageously diesel engines operate at approximately 190 degrees F. and in doing so, dispose heat in excess of 190 degrees F. to the atmosphere. Where applicable, this wasted heat may be recovered and utilized at no cost for the pasteurization process according to the present invention. In the illustrated example, which is not intended to be limiting motor 46, which may be a diesel engine, drives generator 48. Motor coolant from motor 46 passes through the Temperature Control Valve (TCV) 50 at 190 degrees F., through a coil 52 in the volume tank 26 and returns through the TCV 50 to the engine coolant system. Ideally, the temperature in the volume tank would be 180 degrees F. and therefore the TCV would be pre-set at 180 degrees F. Should the return temperature of the coolant exceed 180 degrees F. the TCV valve would automatically open and allow the 190 degree F. coolant to bypass the heating coil 52 and return to the engine coolant system.

Figure 6:
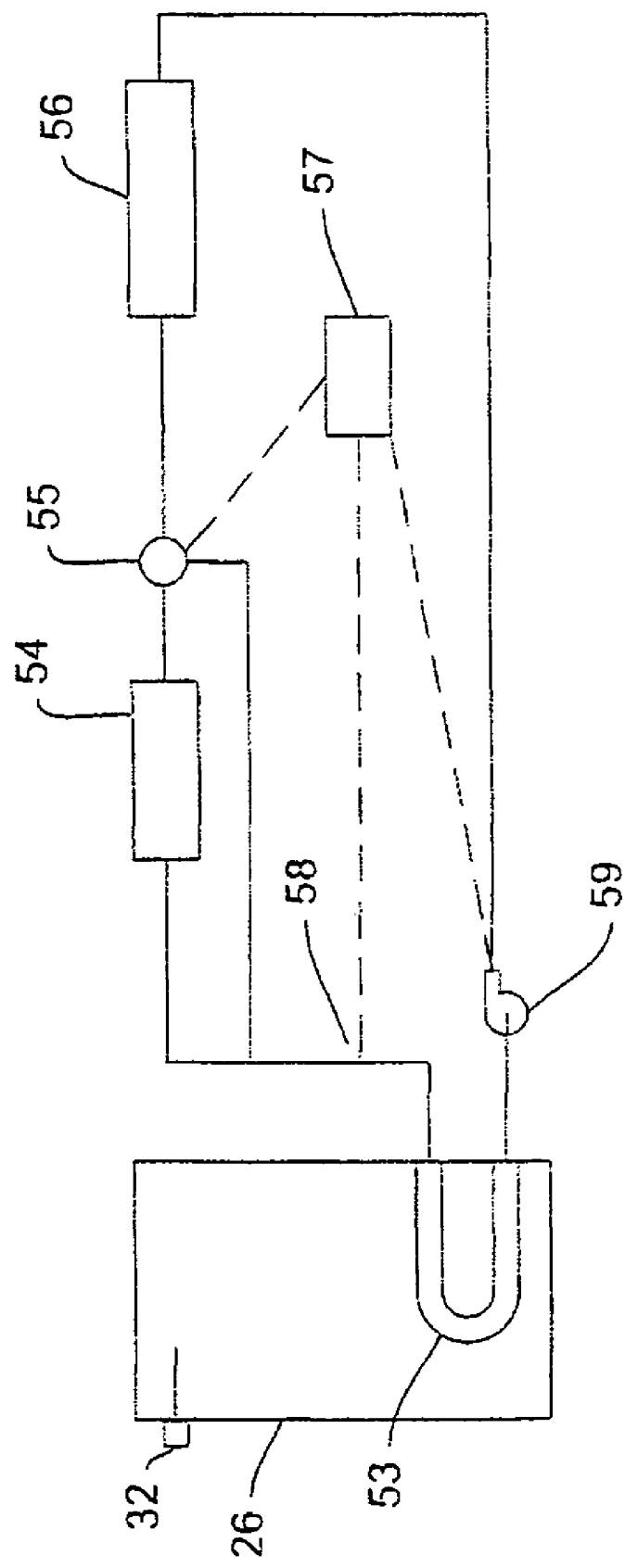
FIG. 6 is, in diagrammatic view, a solar energy collecting apparatus according to one embodiment of the heat source used in the present invention.

The heat source may also be solar energy. Solar energy is provided for example by utilizing cylindrical vacuum tubes that will provide energy at atmospheric temperatures as low as −50 degrees F. The cylindrical shaping allows the sun to be perpendicular to the tubes all day. In the illustrated example of FIG. 6, which again is not intended to be limiting, a glycol solution that will not freeze in sub-zero temperatures is pumped by pump 59 through the solar panel 56 with an exit temperature of approximately 212 degrees F. The fluid then passes through incoming mixing valve 55 whereby a portion thereof passes through the heat dispersal radiator 54 exiting at approximately 100 degrees F. The remaining portion at 212 degrees F. by-passes the radiator and is then mixed with the 100 degrees F. stream to produce a stream of desired temperature of 180 degrees F.-190 degrees F. to the internal coil 53 in the volume tank 26. Controller 57 accepts input from the thermo-sensor 58 and provides control output to the mixing valve 55. In the event the sun does-not shine, a thermostatically controlled electrical heating element 32 such as described above will activate and retain the desired temperature in the volume tank 26. Should this happen, controller 57 will shut-down the pump 59.

Heat exchangers are commercially available with capacities that range from 5 gallons-per-minute (gpm) (7200 gallons-per-day gpd) to 16,000 gpm (23 million gpd). For volumes larger than 23 million gpd systems according to the present invention are provided in parallel systems. The other system components are sized accordingly.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below.

What is claimed is:

1. A method for fluid treatment comprising the steps of:
   a) providing an apparatus comprising:
      a fluid path having an upstream end and an opposite downstream end, wherein
      a fluid stream flowing along said fluid path flows from said upstream end to said downstream end,
      a heat exchanger having counter-flow sections comprising a first section between a cold inlet and a corresponding hot outlet, and a second section between a hot inlet and a corresponding cold outlet wherein said fluid path is in counter flow for exchange of heat between said first and second sections,
      a volume tank having a tank inlet upstream of a tank outlet along said fluid path, said volume tank mounted downstream of said hot outlet of said first section, so that said tank inlet is in fluid communication with said hot outlet of said first section and so that heated fluid from said hot outlet enters said volume tank through said tank inlet,
      said volume tank containing a series of baffles, wherein adjacent baffles within said series of baffles are offset from one another so that a corresponding section of said fluid path prescribes a tortuous flow path winding through said series of baffles, wherein fluid entering said tank inlet passes continuously through said series of baffles so as to dwell in said tank for a retention time, thereafter exiting said volume tank from said tank outlet,
      a heater cooperating with said volume tank so as to heat the fluid in said volume tank to a pasteurization temperature thereby pasteurizing the fluid in said volume tank during said retention time as the fluid passes in a continuous flow along said fluid path through said volume tank,
      said tank outlet upstream of and in fluid communication with said hot inlet of said second section,
      wherein, in said counter-flow sections of said heat exchanger, said heat exchanger causes a temperature increase in fluid in the fluid path of said first section, and causes a temperature decrease in fluid in the fluid path of said second section, and wherein the temperature differential of said temperature increase of said first section is substantially equal to the temperature differential of said temperature decrease of said second section,
      and wherein a temperature differential of the fluid in said volume tank as compared between said tank inlet and said tank outlet is in a range of substantially 1-3 degrees Fahrenheit so that the fluid exiting said tank outlet is hotter in substantially said range than the fluid entering said tank inlet,
   b) pumping the fluid along said flow path from said upstream end to said downstream end,
   c) pre-heating the fluid in said first section of said heat exchanger
   d) heating the fluid in said volume tank only within said range of substantially 1-3 degrees Fahrenheit using waste heat from a separate process,
   e) counter-flowing the heated fluid from said tank outlet of said volume tank through said second section of said heat exchanger so as to pre-heat the fluid in step (c) above,
   f) dispersing the downstream fluid from said cold outlet of said heat exchanger.

2. The method of claim 1 further comprising providing an engine as said separate process and using the waste heat from heated coolant fluid from said engine as a heat source for said heater.

3. The method of claim 2 further comprising providing a diesel engine as said engine.

4. The method of claim 3 further comprising providing a motor generator set which includes said diesel engine.

5. The method of claim 1 further comprising providing a siphon breaker mounted in said fluid path downstream of said volume tank.

6. The method of claim 5 further comprising the step of breaking of a siphon effect in the fluid flowing from said volume tank along said fluid path by use of said siphon breaker.

7. The method of claim 1 further comprising providing an air release valve mounted to, in fluid communication with, said volume tank.

* * * * *